United States Patent
Westberg et al.

(10) Patent No.: US 10,313,472 B2
(45) Date of Patent: Jun. 4, 2019

(54) ENABLING EFFICIENT PRE-LOADING OF DATA FOR A NETWORK CLIENT

(71) Applicant: Telefonaktiebolaget LM Ericsson (publ), Stockholm (SE)

(72) Inventors: Lars Westberg, Enköping (SE); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 239 days.

(21) Appl. No.: 15/105,156

(22) PCT Filed: Mar. 19, 2014

(86) PCT No.: PCT/SE2014/050325
§ 371 (c)(1),
(2) Date: Jun. 16, 2016

(87) PCT Pub. No.: WO2015/142230
PCT Pub. Date: Sep. 24, 2015

(65) Prior Publication Data
US 2016/0323410 A1 Nov. 3, 2016

(51) Int. Cl.
*H04L 29/06* (2006.01)
*H04L 29/08* (2006.01)

(52) U.S. Cl.
CPC .......... *H04L 67/2847* (2013.01); *H04L 67/02* (2013.01); *H04L 67/42* (2013.01)

(58) Field of Classification Search
CPC ........... G06F 17/30902; G06F 2216/13; H04L 67/02; H04L 67/2847; H04L 67/10; H04L 67/22
See application file for complete search history.

(56) References Cited

U.S. PATENT DOCUMENTS 5,832,231 A * 11/1998 Raman ............... G06F 16/40
709/234
5,860,150 A * 1/1999 Chiarot ............... G06F 9/3802
711/213
(Continued)

FOREIGN PATENT DOCUMENTS

EP 2400720 A1 * 12/2011 ....... G06F 17/30867
EP 2503473 A1 9/2012
(Continued)

OTHER PUBLICATIONS

Koivisto, Antti, "Optimizing Page Loading in the Web Browser," webkit.org/blog/166/optimizing-page-loading-in-web-browser/, Mar. 23, 2008, WebKit, pp. 1-5.
(Continued)

*Primary Examiner* — Sargon N Nano
(74) *Attorney, Agent, or Firm* — Withrow & Terranova, PLLC

(57) ABSTRACT

Disclosed is a method having at least one of the steps of: sending requests for data to at least one web site hosted by at least one server; receiving responses corresponding to the requests for data from the at least one web site; compiling, for each of the at least one web site, data location statistics including a set of data locations identified in the responses from the web site; and selecting, for each of the at least one web site, a smaller subset of at least one data location from the identified set of data locations to act as candidate data location(s) for pre-loading data for the network client; and transferring, for each of the at least one web site, the smaller subset of at least one data location acting as candidate data location(s) to a pre-loading unit, for enabling pre-loading of data based on the candidate data location(s).

28 Claims, 15 Drawing Sheets

(56) References Cited

U.S. PATENT DOCUMENTS

| | | | |
|---|---|---|---|
| 6,226,667 B1* | 5/2001 | Matthews | G06F 9/4416 |
| | | | 709/203 |
| 6,366,947 B1 | 4/2002 | Kavner | |
| 6,643,744 B1* | 11/2003 | Cheng | A63F 13/10 |
| | | | 711/137 |
| 6,993,591 B1* | 1/2006 | Klemm | H04L 67/2847 |
| | | | 707/999.002 |
| 7,331,038 B1 | 2/2008 | Snodgrass et al. | |
| 7,565,494 B1 | 7/2009 | Todd et al. | |
| 7,747,749 B1* | 6/2010 | Erikson | G06F 16/9574 |
| | | | 709/226 |
| 8,639,694 B1* | 1/2014 | Wolfe | G06F 16/217 |
| | | | 707/736 |
| 8,689,210 B2* | 4/2014 | Ding | G06F 8/61 |
| | | | 711/137 |
| 9,037,638 B1* | 5/2015 | Lepeska | H04L 67/2847 |
| | | | 709/203 |
| 9,106,607 B1* | 8/2015 | Lepeska | H04L 67/2847 |
| 9,137,125 B1* | 9/2015 | Doronichev | H04L 41/509 |
| 9,325,527 B2* | 4/2016 | Kisel | H04L 12/5695 |
| 9,342,289 B2* | 5/2016 | Ding | G06F 8/61 |
| 9,401,968 B2* | 7/2016 | Liu | H04L 67/2847 |
| 9,912,718 B1* | 3/2018 | Lepeska | H04L 67/02 |
| 2003/0061451 A1 | 3/2003 | Beyda | |
| 2004/0230748 A1 | 11/2004 | Ohba | |
| 2008/0096605 A1* | 4/2008 | Gissin | H04L 67/303 |
| | | | 455/556.2 |
| 2009/0287750 A1* | 11/2009 | Banavar | H04L 29/06 |
| 2015/0007239 A1* | 1/2015 | Cranman | H04N 21/2402 |
| | | | 725/95 |

FOREIGN PATENT DOCUMENTS

| | | |
|---|---|---|
| GB | 2356474 A | 5/2001 |
| WO | 2010071709 A1 | 6/2010 |
| WO | 2013170903 A1 | 11/2013 |

OTHER PUBLICATIONS

International Search Report and Written Opinion for International Patent Application No. PCT/SE2014/050325, dated Jun. 24, 2014, 11 pages.

* cited by examiner

ENABLING EFFICIENT PRE-LOADING OF DATA FOR A NETWORK CLIENT

This application is a 35 U.S.C. § 371 national phase filing of International Application No. PCT/SE2014/050325, filed Mar. 19, 2014, the disclosed of which is incorporated herein by reference in its entirety.

TECHNICAL FIELD

The proposed technology generally relates to a method for enabling pre-loading of data for a network client in a communication network, and a method for providing data to a network client in a communication network, and corresponding network nodes and computer programs.

BACKGROUND

It is a general demand for efficient download of data for network clients in communication networks such as the Internet. For example, it is well known that the loading speed in a network client is limited by the available connection bandwidth. However, bandwidth is not the only limiting factor.

FIG. 1 is a schematic diagram illustrating an example of the download time for the Wall Street Journal front page as a function of bandwidth for different latency values [1].

It is clear that available bandwidth is an important factor, but so is connection latency. Lower bandwidth means longer download times. Higher latency means longer download times. Latency is thus a significant problem and wireless networks often have inherently high latencies.

Slow web page download for wireless networks is indeed a Quality of Experience, QoE, problem, where end-users compare the mobile access with the higher performance fixed broadband networks.

From FIG. 1 it can also be seen that the utilization, which is shown as percentage values along the vertical dashed lines, is lower at high bit rates. It has also turned out to decrease with higher latencies. In particular, wireless networks with higher round trip times and delays can generally not efficiently utilize the access.

One way is to push content to the client before it actually needs it, using so-called pre-loading to enhance the download times. The object to be downloaded is assumed to be known and therefore it can be pushed to the browser cache. This means that the access can be fully utilized but it requires knowledge in-advance. One of the main goals is to create "a priori" knowledge about what the client will request.

In reference [1] it is suggested that when script loading halts the main parser, a side parser can go through the rest of the page code to find more resources to load, and the resources can also be prioritized so that scripts and style sheets load before images. With these optimizations the impact of network latency can be reduced and the download times improved, as schematically illustrated in FIG. 2.

However, a problem is to know the dynamic content in-advance. For a specific web site this may be done by the web site itself but it requires an optimized design of the web site which is not that common.

Transparent Internet caching will improve the performance for statically stored objects, but may only cache a subset of content. In the end, only a smaller part of the efficiency is gained.

Many objects in the web pages are dependent on states in the clients or web sites. Therefore, methods that cannot manage the dynamic nature of the web pages in some way will ultimately not give fast download times. Traditional caching techniques can usually mange the static part of the content but the dynamic objects are usually not cached. The classical caching solution has difficulties to accelerate the download of dynamic content of web pages.

Reference [2] proposes dynamic preloading of data to a proxy using multiple instances of the client, so-called shadow browsers, running in an intermediate network node between the original client and the remote web server. However, although this is a quite satisfactory solution able to handle dynamic content, it is processing intense since it requires multiple instances of the web browser for each client.

There is thus a demand for solutions for reducing the download times in an efficient manner, especially for wireless networks. It is also desirable to be able to handle both static and at least some of the dynamic content.

SUMMARY

It is a general object to provide data to network clients in a communication network, and/or support such providing of data to the network clients.

It is an object to provide a method performed by a network node for enabling pre-loading of data for a network client in a communication network.

It is also an object to provide a method performed by a network node for providing data to a network client in a communication network.

It is another object to provide a network node configured to enable pre-loading of data for a network client in a communication network.

Yet another object is to provide a network node configured to provide data to a network client in a communication network.

Still another object is to provide a network node for supporting pre-loading of data for a network client in a communication network.

It is an object to provide a network node for supporting transfer of data to a network client in a communication network.

It is also an object to provide corresponding computer programs.

These and other objects are met by embodiments of the proposed technology.

According to a first aspect, there is provided a method performed by a network node for enabling pre-loading of data for a network client in a communication network. The method comprises the steps of sending requests for data to at least one web site hosted by at least one server, and receiving responses corresponding to the requests for data from the at least one web site. The method further comprises the step of compiling, for each of the at least one web site, data location statistics including a set of data locations identified in the responses from the web site, and selecting, for each of the at least one web site, a smaller subset of at least one data location from the identified set of data locations to act as candidate data location(s) for pre-loading data for the network client. The method also comprises the step of transferring, for each of the at least one web site, the smaller subset of at least one data location acting as candidate data location(s) to a pre-loading unit, for enabling pre-loading of data based on the candidate data location(s).

According to a second aspect, there is provided a method performed by a network node for providing data to a network client in a communication network. The method comprises the steps of receiving, from the network client, information specifying a web site, and providing, for the specified web site, at least one candidate data location selected based on compiled data location statistics. The method further comprises the step of pre-loading, from a server corresponding to the specified web site, data specified by the at least one candidate data location. The method also comprises the step of sending, in response to a subsequent request from the network client for data specified by a data location matching the at least one candidate data location, the pre-loaded data to the network client.

According to a third aspect, there is provided a network node configured to enable pre-loading of data for a network client in a communication network. The network node is configured to send requests for data to at least one web site hosted by at least one server, and configured to receive responses corresponding to the requests for data from the at least one web site. The network node is further configured to compile, for each of the at least one web site, data location statistics including a set of data locations identified in the responses from the web site, and configured to select, for each of the at least one web site, a smaller subset of at least one data location from the identified set of data locations to act as candidate data location(s) for pre-loading data for the network client. The network node is also configured to transfer, for each of the at least one web site, the smaller subset of at least one data location acting as candidate data location(s) to a pre-loading unit, for enabling pre-loading of data based on the candidate data location(s).

According to a fourth aspect, there is provided a network node configured to provide data to a network client in a communication network. The network node is configured to receive, from the network client, information specifying a web site, and configured to provide, for the specified web site, at least one candidate data location selected based on compiled data location statistics. The network node is further configured to pre-load, from a server corresponding to the specified web site, data specified by the at least one candidate data location. The network node is also configured to send, in response to a subsequent request from the network client for data specified by a data location matching the at least one candidate data location, the pre-loaded data to the network client.

According to a fifth aspect, there is provided a computer program comprising instructions, which when executed by at least one processor, cause the processor(s) to:
  prepare data requests for sending to at least one web site hosted by at least one server;
  read responses, corresponding to the data requests, received from the at least one web site;
  compile, for each of the at least one web site, data location statistics including a set of data locations identified in the responses from the web site;
  select, for each of the at least one web site, a smaller subset of at least one data location from the identified set of data locations to act as candidate data location(s) for pre-loading data for the network client; and
  prepare, for each of the at least one web site, the smaller subset of at least one data location acting as candidate data location(s) for transfer to a pre-loading unit.

According to a sixth aspect, there is provided a computer program comprising instructions, which when executed by at least one processor, cause the processor(s) to:
  read information specifying a web site;
  provide, for the specified web site, at least one candidate data location selected based on compiled data location statistics;
  control pre-loading, from a server corresponding to the specified web site, of data specified by the at least one candidate data location; and
  prepare, in response to a subsequent request from the network client for data specified by a data location matching the at least one candidate data location, the pre-loaded data for transfer to the network client.

According to a seventh aspect, there is provided a network node for supporting pre-loading of data for a network client in a communication network. The network node comprises a data request preparation module for preparing data requests for sending to at least one web site hosted by at least one server, and a reading module for reading responses, corresponding to the data requests, received from the at least one web site. The network node also comprises a compiling module for compiling, for each of the at least one web site, data location statistics including a set of data locations identified in the responses from the web site, and a selection module for selecting, for each of the at least one web site, a smaller subset of at least one data location from the identified set of data locations to act as candidate data location(s) for pre-loading data for the network client.

According to an eighth aspect, there is provided a network node for supporting transfer of data to a network client in a communication network. The network node comprises a reading module for reading information specifying a web site, and a providing module for providing, for the specified web site, at least one candidate data location selected based on compiled data location statistics. The network node also comprises a pre-load control module for controlling pre-loading, from a server corresponding to the specified web site, of data specified by the at least one candidate data location, and a data preparation module for preparing, in response to a subsequent request from the network client for data specified by a data location matching the at least one candidate data location, the pre-loaded data for transfer to the network client.

An advantage of the proposed technology is that it enables efficient providing of data for a network client in a communication network, allowing a reduction of download times compared to conventional methods and/or efficient handling of dynamic content.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
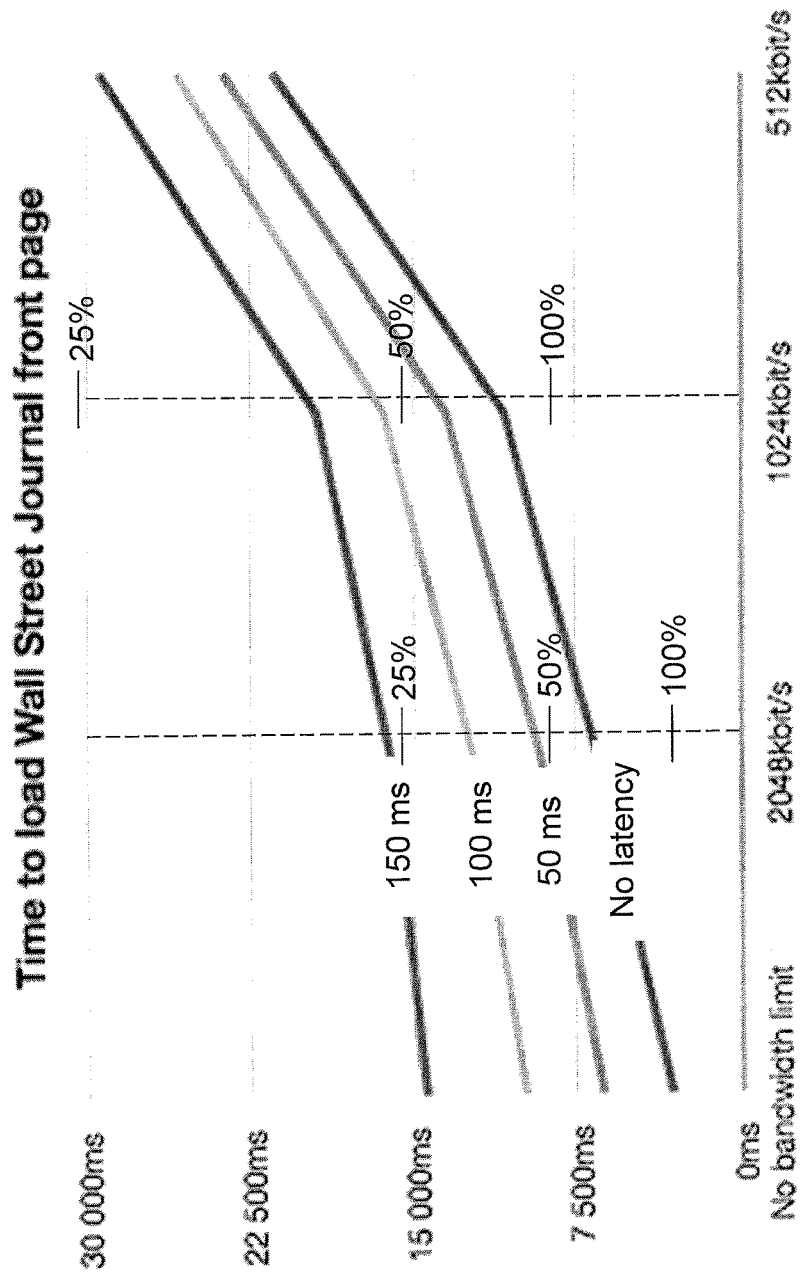
FIG. 1 is a schematic diagram illustrating an example of the download time for the Wall Street Journal front page as a function of bandwidth for different latency values.
Figure 2:
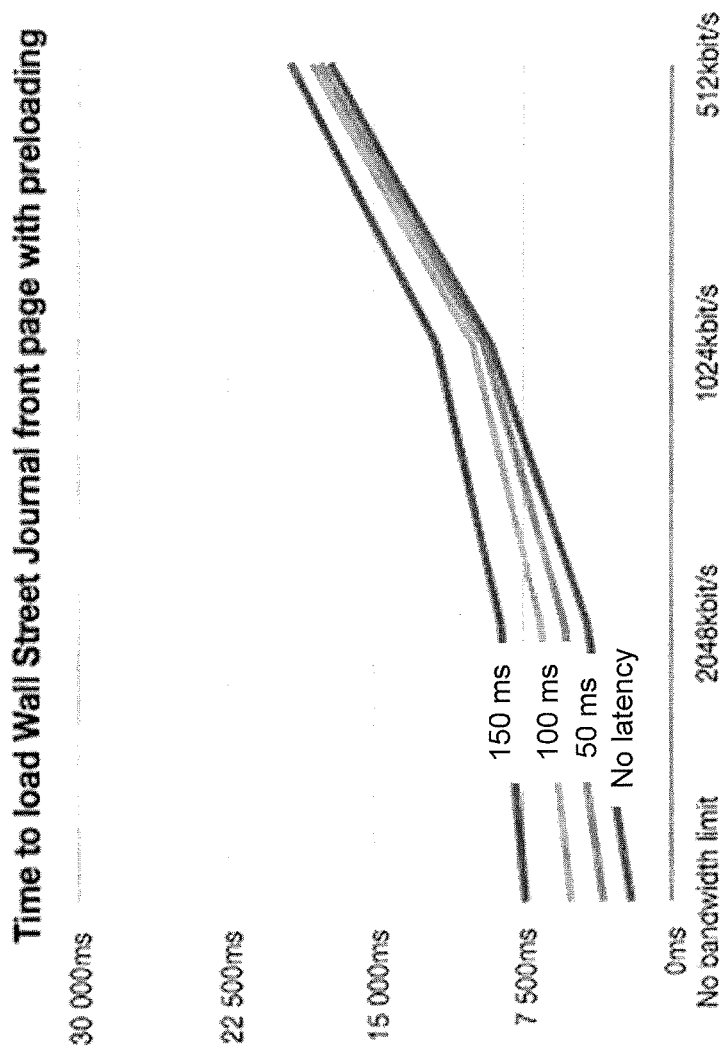
FIG. 2 is a schematic diagram illustrating an example of the download time for the Wall Street Journal front page with preloading.

Throughout the drawings, the same reference designations are used for similar or corresponding elements.

For a better understanding of the proposed technology, it may be useful to begin with a brief overview of the novel functionality for data location statistics. By way of example, it is suggested to compile data location statistics for at least one web site based on responses corresponding to requests for data sent to the web site(s), and select, for each of the web site(s), a smaller subset of at least one data location to act as candidate data location(s) for pre-loading data for a network client.

From an architectural point of view, there exist a plurality of potential realizations. For example, two different potential realizations of the proposed solution are shown in FIG. 3 and FIG. 4.

In general, a network client 10 wants to access data from a web site 20 hosted by at least one server via an intermediate network node 30 over an access network 40 and/or the Internet 50 or a similar network. The network node 30 has a pre-loading unit 32 that is configured to pre-load data from the server corresponding to the web site 20.

Figure 3:
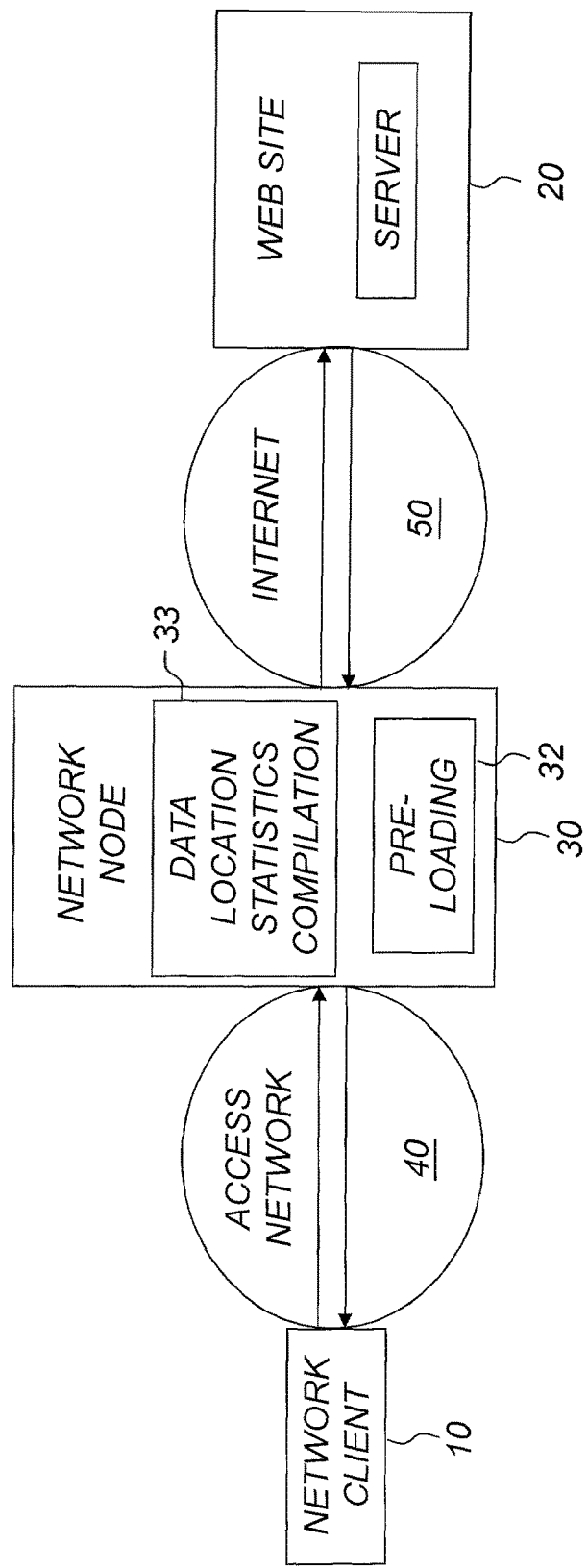
FIG. 3 is a schematic block diagram illustrating an example overview of a network architecture for providing data to a network client in which an intermediate network node responsible for pre-loading of data has functionality for compiling data location statistics.

In the particular example of FIG. 3, the network node 30 is configured to compile data location statistics, and select or provide one or more candidate data locations based on the compiled data location statistics. As an example, the network node 30 may include a data location statistics compilation unit 33 configured to compile the data location statistics and select candidate data location(s). The pre-loading unit 32 then pre-loads data specified by the candidate data location(s). In response to a subsequent request from the network client 10 for data specified by a data location matching a candidate data location, the corresponding pre-loaded data is sent from the network node 30 to the network client 10.

Figure 4:
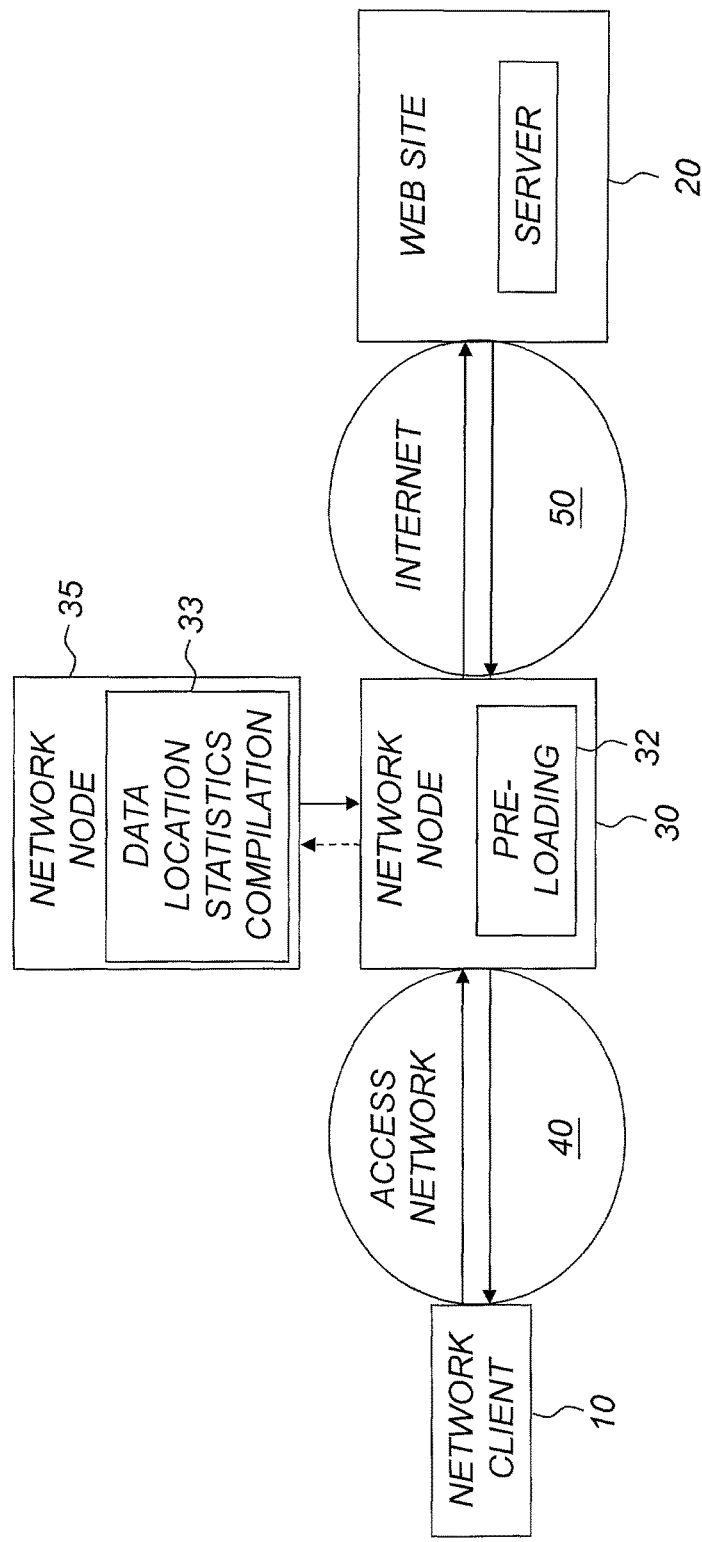
FIG. 4 is a schematic block diagram illustrating an example overview of a network architecture for providing data to a network client in which an intermediate network node responsible for pre-loading of data is adapted for cooperation with a separate network node having functionality for compiling data location statistics.

In the particular example of FIG. 4, the intermediate network node 30 responsible for pre-loading of data is adapted for cooperation with a separate network node 35 that is configured to compile data location statistics.

In this example, the network node 35 is thus configured to compile data location statistics for at least one web site based on responses corresponding to requests for data sent to the web site(s), and select, for each of the web site(s), a smaller subset of at least one data location to act as candidate data location(s). As an example, the network node 35 may include a data location statistics compilation unit 33 configured to compile the data location statistics and select candidate data location(s). Information about the candidate data location(s) is transferred from the network node 35 to the network node 30 responsible for pre-loading of data.

By way of example, the network client 10 may be a network terminal or a computer program running on the network terminal, e.g. a web browser running on the network terminal. The network terminal may be any device capable of wired and/or wireless communication with other devices and/or network nodes in the network.

A web site can be regarded as a set of one or more related web pages served from a web domain. The web site is hosted on one or more web servers, and the term web site therefore also corresponds to the corresponding server(s). A web site thus comprises one or more servers for hosting a web domain and/or associated web pages. The servers are normally remote servers that can be accessed via one or more networks such as the Internet and/or other networks. Sometimes a web site is also referred to as a web portal. The terms "web site" and "web portal" will be used interchangeable herein.

The proposed technology is generally applicable for reducing download times in a highly efficient manner. It should though be understood that since wireless/mobile access normally introduces additional latency compared to fixed networks, the proposed technology may be even more effective for wireless/mobile technologies.

By way of example, when the network client has mobile access to the Internet, the network node 30 may be a Radio Network Controller for High Speed Packet Access, HSPA, networks or an eNodeB for Long Term Evolution, LTE, networks, or a core network node. If the functionality is implemented in a proxy server, the proxy server may then be implemented in or integrated as part of the RNC or eNodeB, or the core network node.

Figure 5:
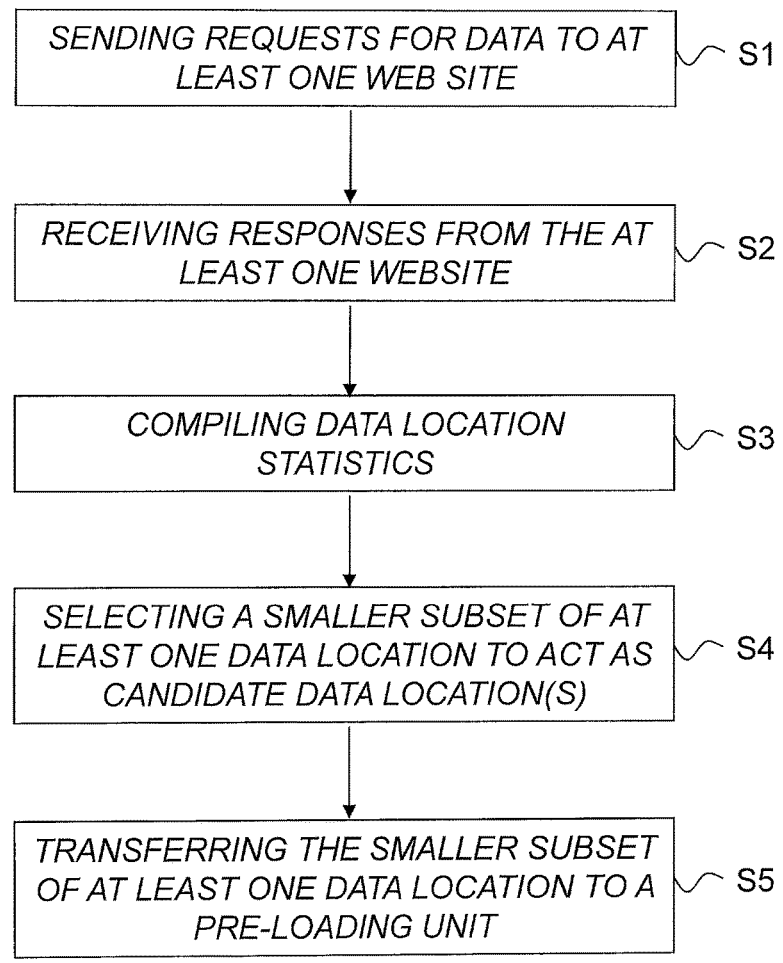
FIG. 5 is a schematic flow diagram illustrating an example of a method for enabling pre-loading of data for a network client in a communication network.

FIG. 5 is a schematic flow diagram illustrating an example of a method for enabling pre-loading of data for a network client in a communication network.

In step S1, the network node sends requests for data to at least one web site hosted by at least one server.

In step S2, the network node receives responses corresponding to the requests for data from the at least one web site.

In step S3, the network node compiles, for each of the at least one web site, data location statistics including a set of data locations identified in the responses from the web site.

In step S4, the network node selects, for each of the at least one web site, a smaller subset of at least one data location from the identified set of data locations to act as candidate data location(s) for pre-loading data for the network client.

In step S5, the network node transfers, for each of the at least one web site, the smaller subset of at least one data location acting as candidate data location(s) to a pre-loading unit, for enabling pre-loading of data based on the candidate data location(s).

Figure 6:
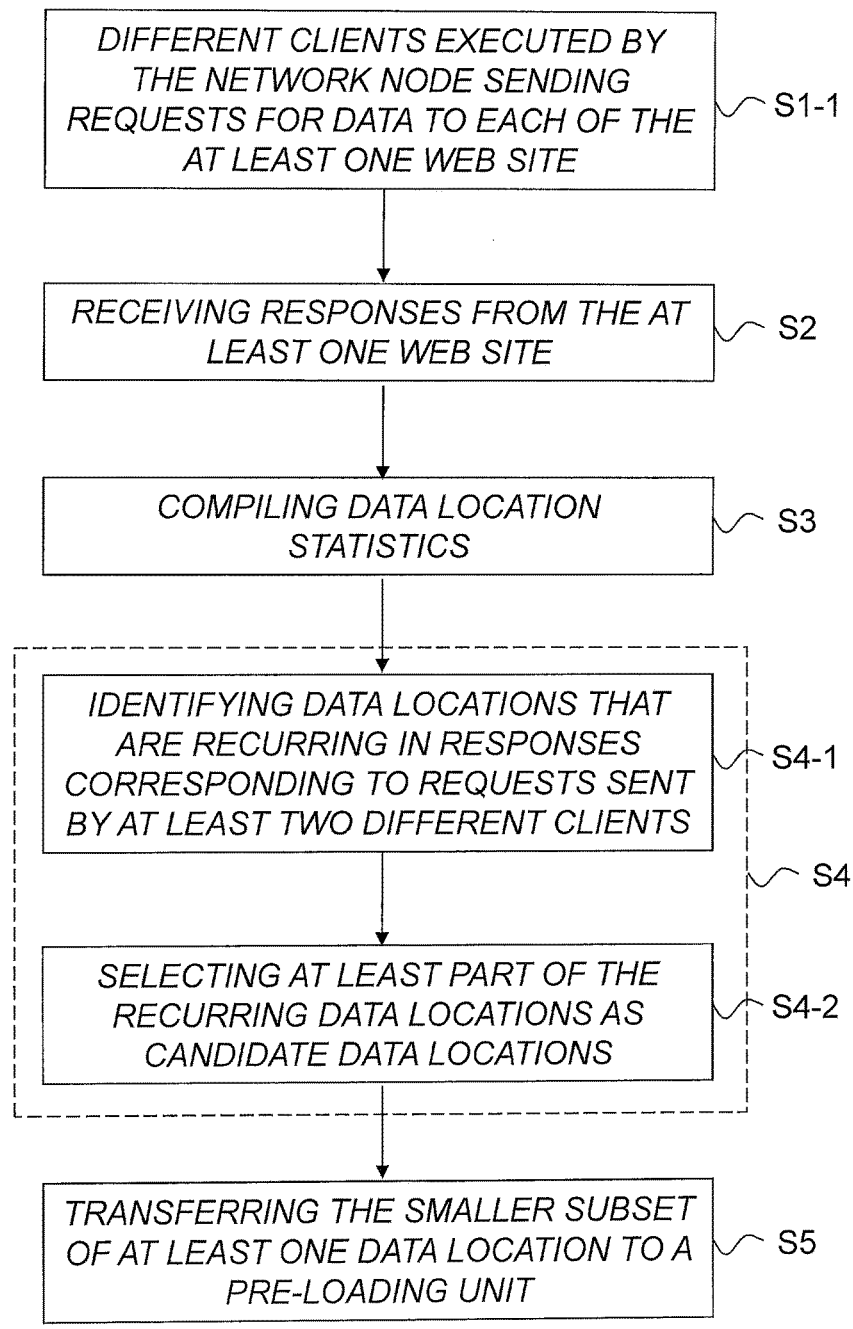
FIG. 6 is a schematic flow diagram illustrating another specific example of a method for enabling pre-loading of data for a network client in a communication network.

FIG. 6 is a schematic flow diagram illustrating another specific example of a method for enabling pre-loading of data for a network client in a communication network. In this particular example, the step S1 of sending requests for data comprises the step S1-1 of different clients, executed by the network node, sending requests for data to each of the web site(s). Further, the step S4 of selecting, for each of the web site(s), a smaller subset of at least one data location from the identified set of data locations comprises the steps of identifying S4-1 data locations that are recurring in responses corresponding to requests for data sent by at least two different clients, and selecting S4-2 at least part of the recurring data locations as candidate data locations. The other steps are the same as in FIG. 5.

By way of example, the recurring data locations are deterministic data locations in common for responses corresponding to requests for data sent by at least two different clients.

It is also possible to select at least part of the recurring data locations as candidate data locations by selecting recurring data locations with a recurrence frequency above a threshold.

As an example, the different clients executed by the network node may be clients of different types and/or different configurations.

For efficient handling of location dependencies, if a data location is selected as a candidate data location, at least part of the dependent data locations related to the selected candidate data location may also be selected as candidate data locations.

In a particular example embodiment, wherein at least two candidate data locations are selected, the ordering and/or timing for pre-loading data from the candidate data locations is determined for each of the at least one web site. By way of example, information indicative of ordering and/or timing is then transferred, for each one of the web site(s), together with the candidate data locations to the pre-loading unit.

In this context, it is envisaged that at least some of the requests are triggered by received responses. It is therefore a possibility to determine at least one of ordering and timing of the requests by analyzing request patterns in the responses, and using the determined ordering and/or timing of the requests as the ordering and/or timing for pre-loading data from the candidate data locations.

As previously indicated in connection with FIGS. 3 and 4, the smaller subset of at least one data location acting as candidate data location(s) is transferred to a pre-loading unit in the same network node, or transferred to a pre-loading unit in a separate network node.

In a particular example, for each one of the web site(s), the smaller subset of at least one data location acting as candidate data location(s) is provided in a list of data locations for transfer to the separate network node, wherein the list of data locations capable of acting as candidate data locations is organized per web site.

The term data location is a general term, and the corresponding data may be accessed or addressed in a wide variety of ways. For example, the data locations and the candidate data locations may be Uniform Resource Locators, URLs, and the corresponding data includes web content. A Uniform Resource Locator, URL, is often called a web address.

It is thus clear that the method may be used for supporting download of a web page from a web site in a communication network.

As an example, the step S3 of compiling, for each of the at least one web site, data location statistics may be performed by analyzing web page code related to the responses to identify data locations. In this context, at least a main markup language file corresponding to a requested web page is typically analyzed to identify data locations.

A web page is normally a web document suitable for processing and rendering by a web browser. For example, the web browser displays the web page on a monitor. The web page is thus what is displayed or otherwise presented, but it also refers to the underlying web page code that defines the web page to be downloaded and viewed. When executed, the underlying web page code provides visible and/or audible content for presentation as a web page.

Figure 7:
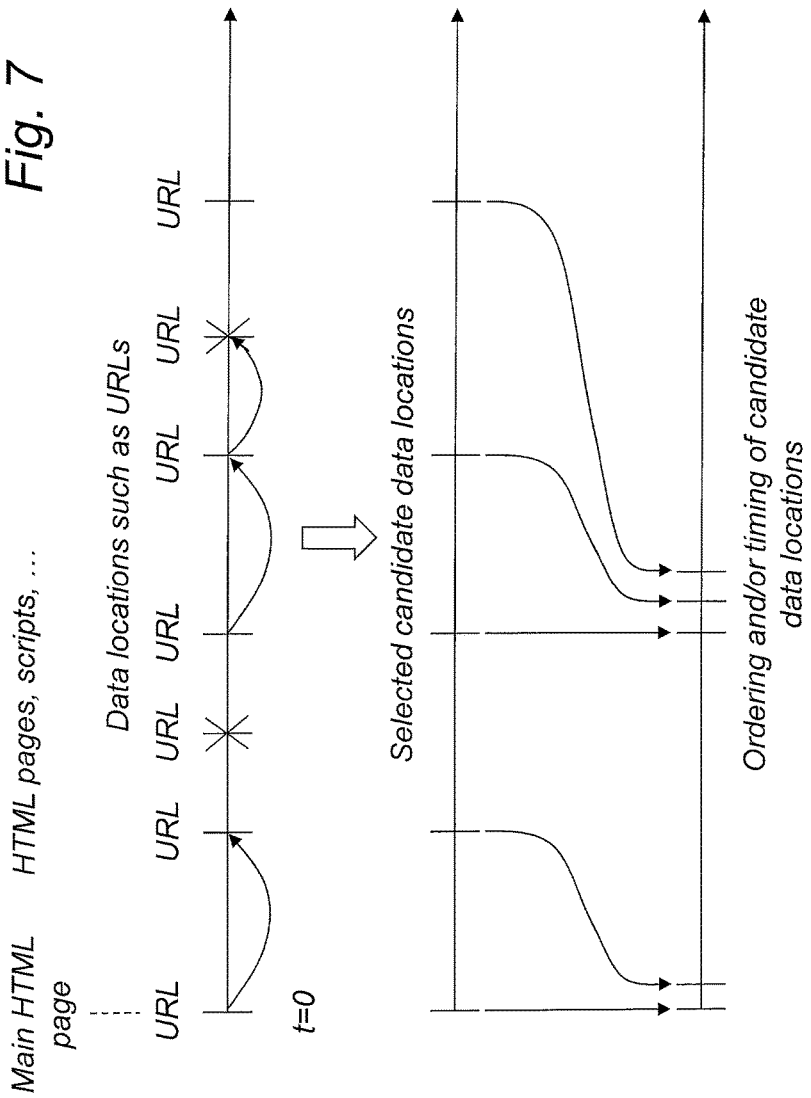
FIG. 7 is a schematic diagram illustrating an example of the process of identifying data locations such as URLs, selecting a smaller subset of candidate data locations and/or determining a suitable ordering and/or timing of the candidate data locations.

FIG. 7 is a schematic diagram illustrating an example of the process of identifying data locations such as URLs, selecting a smaller subset of candidate data locations and/or determining a suitable ordering and/or timing of the candidate data locations.

The web page code is normally organized in a main markup language file such as a main Hyper Text Markup Language, HTML, page, but can also refer to additional HTML pages and/or 'embedded' script files, which may or may not be considered part of the overall web page code.

Each piece of information that may be separately requested for a web page may thus be identified by a data location such as a URL. A specific URL is that of the main page, which is normally requested first. The main page may then contain references to other content/URLs which will then be subsequently requested by the client.

Some of the identified data locations such as URLs are then removed, as indicated by a cross in FIG. 7, in such a way that a smaller subset of so-called candidate data locations are selected. Based on the selected candidate data locations, the ordering and/or timing of the candidate data locations can then be determined. For some data locations only the mutual ordering is important and they may be brought forward in time. For other data locations, the timing is also important for proper downloading of the final data and they must therefore maintain their positions in time.

Figure 8:
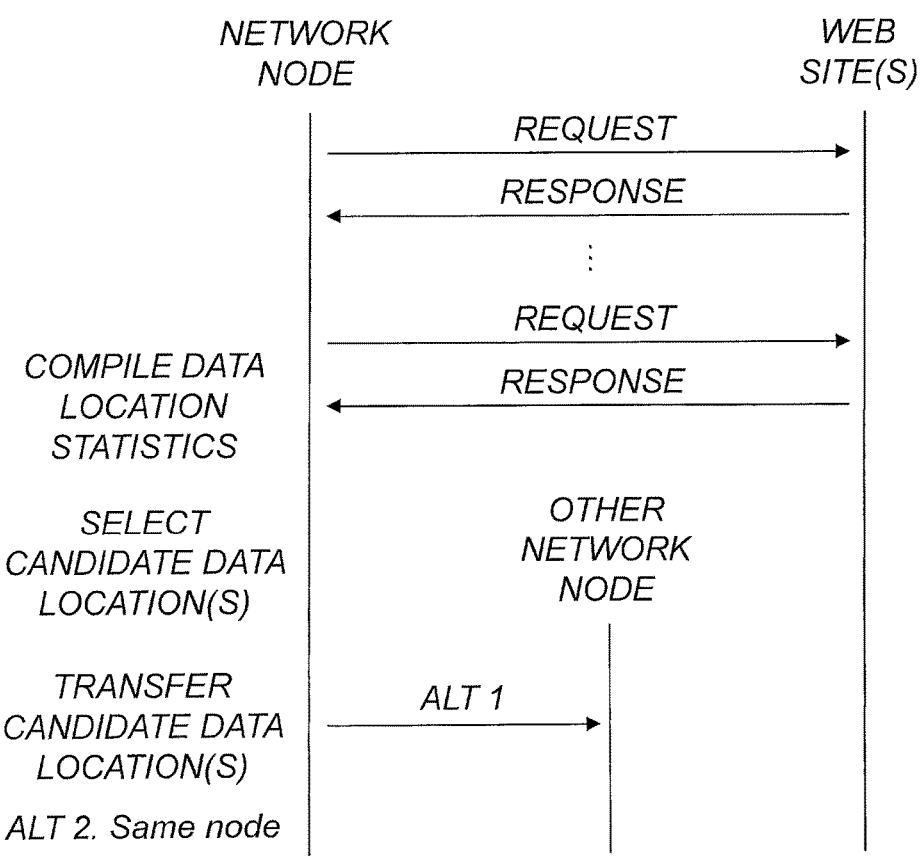
FIG. 8 is a schematic flow diagram illustrating an example of a method for providing data to a network client in a communication network.

FIG. 8 is a schematic signaling diagram illustrating an example of signaling between a network node and one or more web sites in a communication network. The network node configured to enable pre-loading of data for a network client sends requests for data to the web site(s) and receives corresponding responses. The network node then compiles data location statistics including a set of data locations identified in the responses, and selects a smaller subset of at least one so-called candidate data location from the identified set of data locations. In a first alternative (ALT 1) the network node transfers the candidate data location(s) to another network node, which is responsible for pre-loading of data specified by the candidate data location(s). In a second alternative (ALT 2) the network node itself is responsible for the pre-loading, which is thus handled in the same node.

In a particular example, it is also possible to update the candidate data location(s) at least partly based on feedback related to missing data locations discovered during pre-loading.

For example, when a web page is refreshed or otherwise changed, some of the data locations may be removed and other data locations may appear. At least the missing data locations can be identified during pre-loading, when it is discovered that candidate data location(s) is/are not valid any longer. Feedback on missing data locations can thus be used to re-select or update the candidate data locations.

This is straightforward in the example illustrated in FIG. 3, where the pre-loading and the selection of candidate data location(s) take place in the same network node.

With regard to the example of FIG. 4, feedback on missing data locations may optionally be sent from the network node 30 to the network node 35. The network node 35 may then use this feedback to update the candidate data location(s), and send an updated list of candidate data location(s) to the network node 30.

Figure 9:
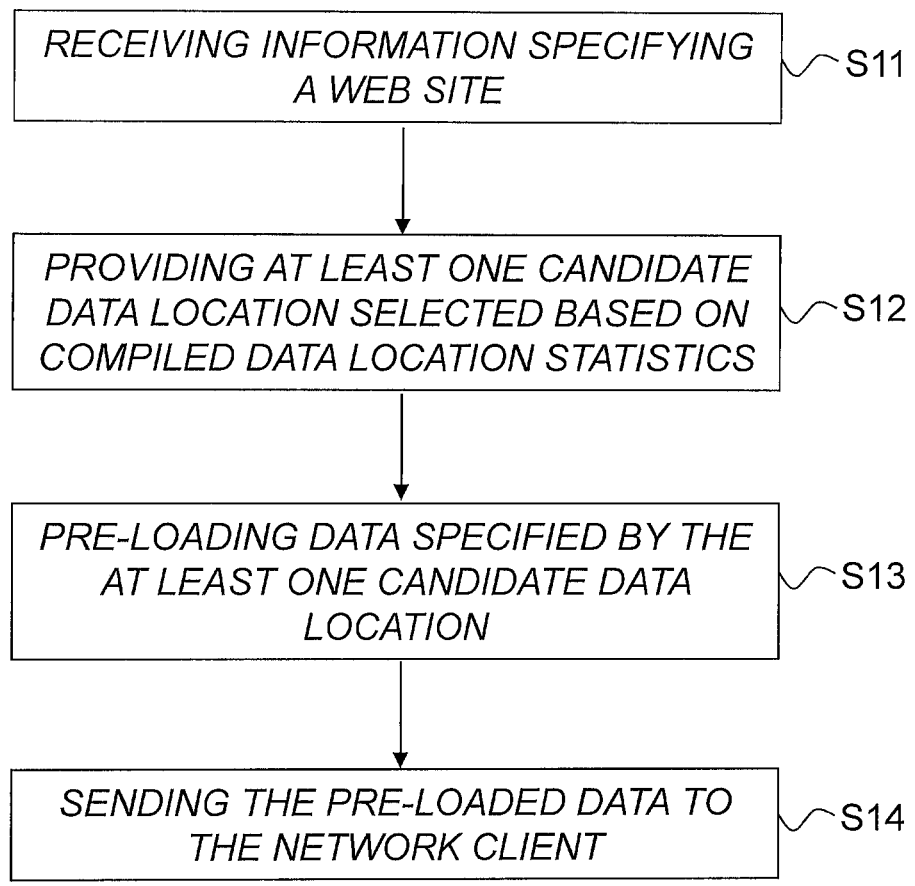
FIG. 9 is a schematic signaling diagram illustrating an example of signaling between a network node and one or more web sites in a communication network.

FIG. 9 is a schematic flow diagram illustrating an example of a method for providing data to a network client in a communication network.

In step S11, the network node receives, from the network client, information specifying a web site.

In step S12, the network node provides, for the specified web site, at least one candidate data location selected based on compiled data location statistics.

In step S13, the network node pre-loads, from a server corresponding to the specified web site, data specified by the at least one candidate data location.

In step S14, the network node sends, in response to a subsequent request from the network client for data specified by a data location matching the at least one candidate data location, the corresponding pre-loaded data to the network client.

As previously indicated in connection with FIGS. 3 and 4, the network node may determine the candidate data location(s), or receive the candidate data location(s) from another network node, in advance of providing data to the network terminal, wherein the at least one candidate data location is pre-selected based on the compiled data location statistics.

As an example, at least two candidate data locations are provided, and data specified by the at least two candidate data locations are pre-loaded from the remote server according to an estimated ordering and/or timing of subsequent data requests by the network client.

As indicated, according to a particular example, the candidate data locations are Uniform Resource Locators, URLs, and the corresponding data includes web content. The network client may for example be a web browser running on a network terminal.

In general, it should be understood that the candidate data location(s) for pre-loading data for the network client may be selected according to any of the embodiments of the previously described method for enabling pre-loading of data for a network client.

Figure 10:
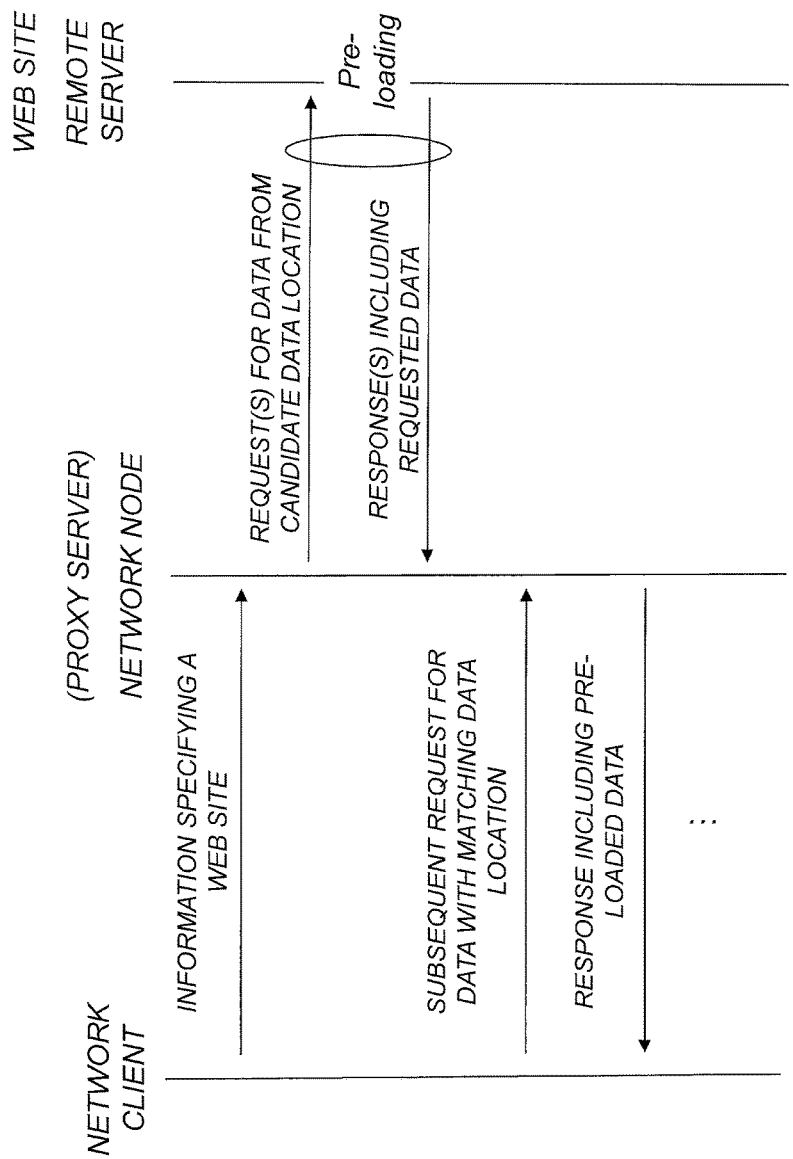
FIG. 10 is a schematic signaling diagram illustrating an example of signaling for providing data to a network client including preloading of data from a remote server by an intermediate network node.

FIG. 10 is a schematic signaling diagram illustrating an example of signaling for providing data to a network client including preloading of data from a remote server by an intermediate network node.

First, the intermediate network node, such as a proxy server, receives information specifying a web site from the network client.

The network node then generates the request(s) for data from the candidate data location(s) and sends the generated request(s) for data to the web server. The network node receives response(s) from the web server including the requested data specified by the candidate data location(s), and stores the requested data specified by the candidate data location(s). This corresponds to the pre-loading. According to the proposed technology, the candidate data location(s) is/are selected based on compiled data location statistics, as described above.

In response to a subsequent request from the network client for data specified by a data location matching a candidate data location, the corresponding pre-loaded data is sent to the network client directly from the intermediate network node.

In the following, examples of the proposed technology will be described with reference to a particular non-limiting use scenario with a proxy server cooperating with a so-called off-line logic. Here, reference will also be made to Uniform Resource Locators, URLs, but it should be understood that this is merely an example of data locations.

Figure 11:
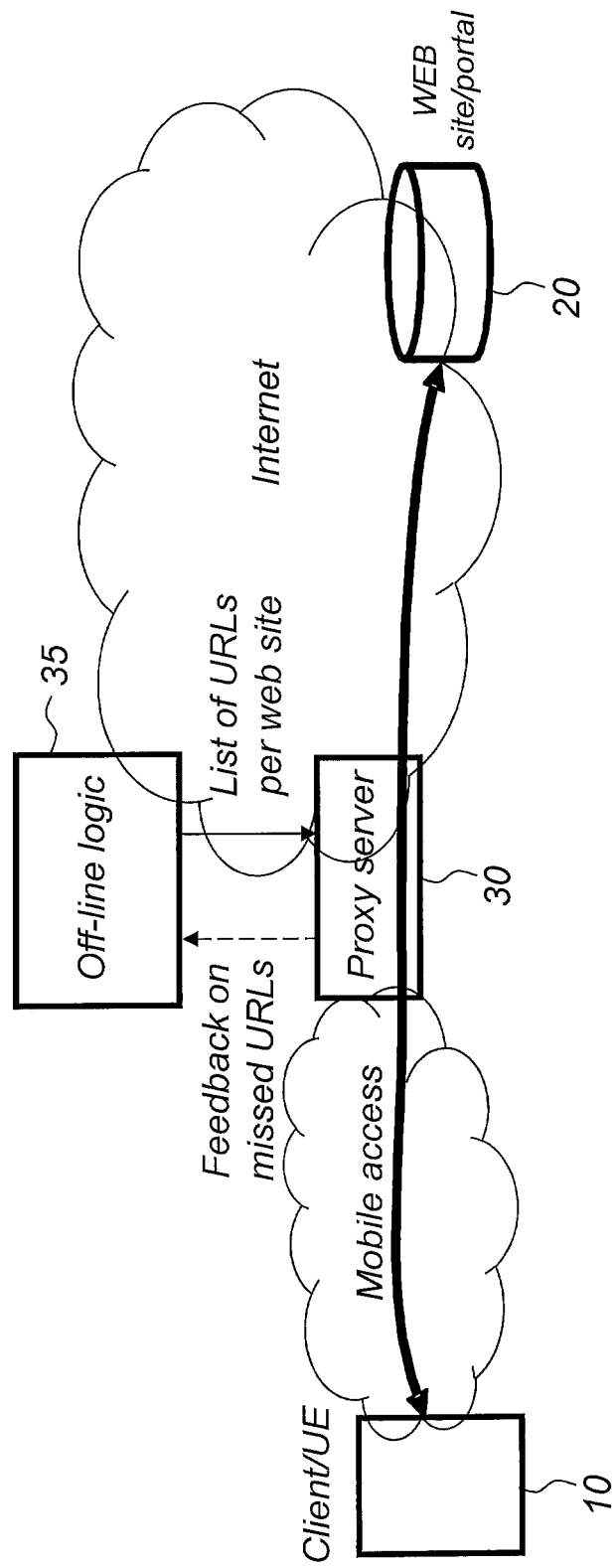
FIG. 11 is a schematic block diagram illustrating an example overview of a network architecture for providing data to a client in which an intermediate proxy server responsible for pre-loading of data is adapted for cooperation with so-called off-line logic configured for compiling data location statistics.

FIG. 11 is a schematic block diagram illustrating an example overview of a network architecture for providing data to a client. In this specific example, an intermediate proxy server 30 responsible for pre-loading of data is adapted for cooperation with so-called off-line logic 35 configured for compiling data location statistics. The off-line logic 35 is normally a computer-implemented unit, which is also referred to as a data location statistics compiler or a candidate data selector. The off-line logic 35 and the proxy server 30 may be implemented in the same network node, or in different network nodes.

In the example of FIG. 11, the client is a wireless device such as a User Equipment, UE, with mobile access to the Internet. The intermediate proxy server 30 and/or the off-line logic 35 may thus be implemented in any suitable network node of the mobile access network or the core network.

By way of example, the off-line logic 35 finds the relevant content to be requested for a given web site or web portal and provides a list of URLs per web site to the proxy server 30. The proxy server 30 would then pre-load these URLs upon client requests for the main web site, preferably keeping indications related to ordering and timing of the requests.

Optionally, the proxy server 30 could send feedback to off-line logic 35 regarding experienced deviations compared to expected functionality, which could trigger a new analysis for that web page, or at least an update of the candidate URL(s).

Figure 12:
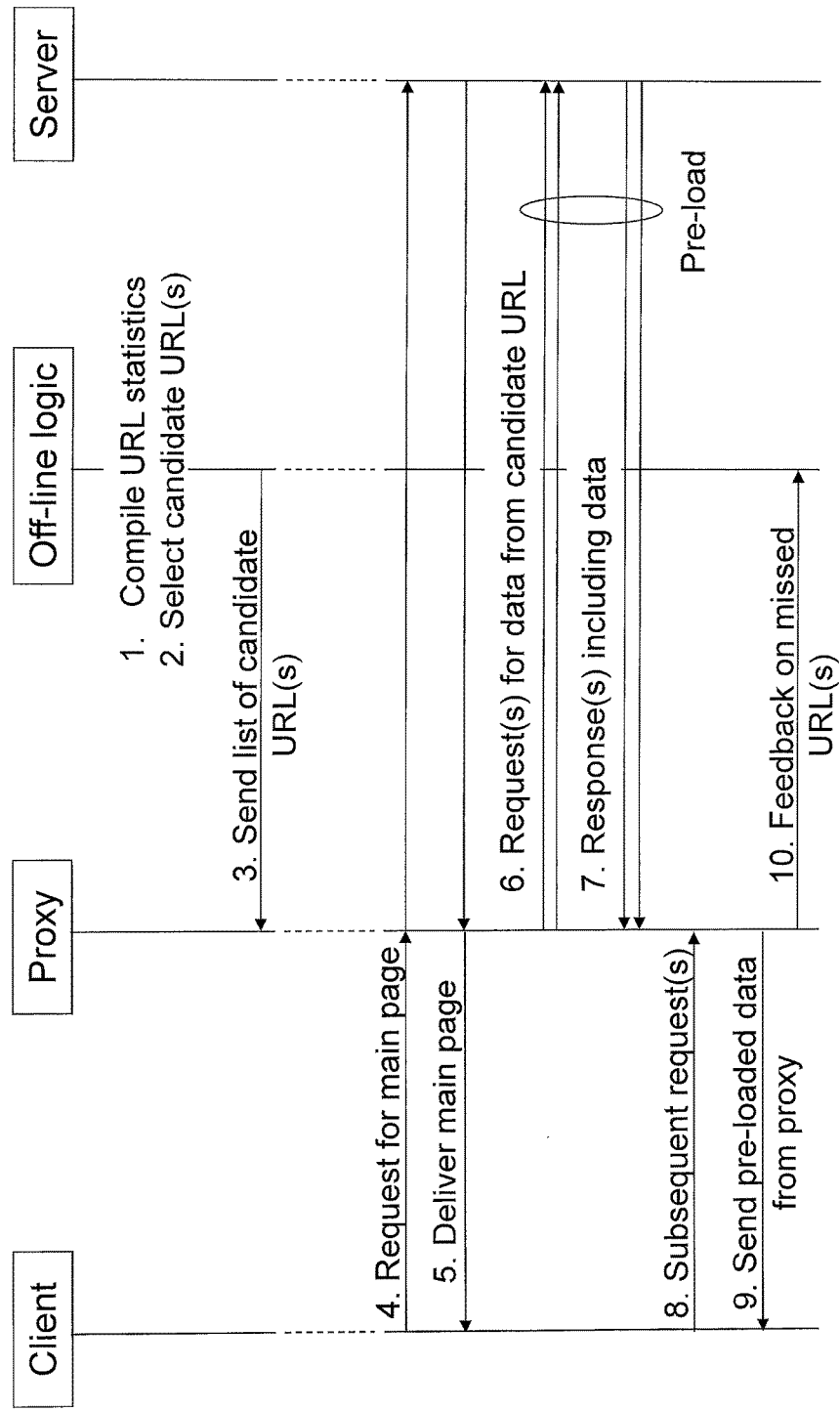
FIG. 12 is a schematic diagram illustrating a specific example of the functions and signaling of the involved nodes shown in the block diagram of FIG. 11.

FIG. 12 is a schematic diagram illustrating a specific example of the functions and signaling of the involved nodes shown in the block diagram of FIG. 11.

1. The off-line logic compiles URL statistics for at least one web site.
2. The off-line logic selects candidate URL(s).
3. The off-line logic sends a list of candidate URL(s), for example per web site.
4. The client wants to download a web-page from a specific web site, requesting a main page.
5. The main page is delivered to the client at some point in time, preferably as soon as possible after being received by the proxy from the remote server.
6. The proxy sends request(s) for from candidate URL(s) to a server of the specific web site, preferably using a specific request ordering, timing and/or dependency information.
7. The proxy receives responses including data from the server of the web site, and stores the data so the data is readily available, e.g. stored in cache.

8. The proxy receives subsequent request(s) for data from the client.
9. The proxy sends pre-loaded data in response to request(s) including a URL matching a candidate URL. Serve the content from local cache if possible.
10. The proxy server sends feedback on missed URL(s) to the off-line logic, which may then re-compile the URL statistics and/or re-select the candidate URL(s) based on the feedback, and send an updated list of candidate URL(s) to the proxy.

As an example, the identification of the relevant content could be based on 'off-line' browser requests to a specific portal, performed by different clients with different configurations:

Client type/device used.
System time.
Random numbers.
Information in client storage HTML5 APIs, e.g., LocalStorage, SessionStorage, WebSQL, IndexedDB, File API.
Cookies.
Other state information, e.g., screen size, window size.

For example, it would be convenient to use existing web browsers to request a certain web site. There is a so-called "User Agent" field that conveys information about the client type and/or operating system. By way of example, this field may be manipulated so that one client can be used to emulate other different clients.

It is desirable to filter out content that is not possible to pre-load. For example, this may be content that may result in unwanted changes in the server state (including potential information loss):

Content that is requested with some cookies.
Dynamic content, e.g. content that has changing URLs in the corresponding requests depending on the client state information and that also results in different server response.

In a specific example, the remaining content is the subset of the list from the analysis, including for example:

Deterministic URLs that are always the same in all requests, and/or those that are not cacheable according to cache-directives. Deterministic URLs may be those URLs that generate the same download of identical content.
Indicated as cacheable by cache-control. In other words, a deterministic response even if the requested URL changes.

There could however be content that is rarely requested and thus may be omitted from the list. As an example, it is suggested that the relevant list of candidate data locations should result from a post-processing of the above items, identifying fixed URLs that are requested with high requests statistics and optionally also some relevant dependencies. The dependencies may be defined in this way: if an URL A is requested than the subset {URLx} is also requested; e.g., if an add script is requested than all related images will be requested. As an example, dependent URLs will be pre-loaded only if the related URL has been requested by the client; therefore, it may also contain ULRs of type A that are requested not too often.

A potential problem with simple content pre-load, i.e. sending all requests at a time is that some content could arrive too late to the proxy server; after the client request has arrived. If this happens the client request has to be forwarded all the way to the remote web server, resulting in large delays. Therefore it may be useful to determine a likely ordering of requests from the clients.

A browser-request based analysis makes it possible to identify the ordering of requests, e.g. by looking at the request patterns. For the timing of the requests, a bin-packing technology can be used to optimize the link-layer capacity to optimize the download. Bin-packing technology is a way to determine the timing for the request; the time when the request should be sent from the proxy, such that the "optimal" download time is achieved. The determined ordering and/or relative timing should then be reflected in the list of candidate data locations sent to the proxy server by the off-line logic.

The proposed technology is applicable for network clients that are wired and/or wireless devices.

As used herein, the non-limiting terms "wireless device" or "User Equipment", UE, may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to any type of network node as part of a fixed or wireless network, including but not limited to base stations, network control nodes such as network controllers, radio network controllers, base station controllers, and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

There is provided a network node 30; 35 configured to enable pre-loading of data for a network client 10 in a communication network. The network node 30; 35 is configured to send requests for data to at least one web site hosted by at least one server. The network node 30; 35 is configured to receive responses corresponding to the requests for data from the at least one web site. The network node 30; 35 is configured to compile, for each of the at least one web site, data location statistics including a set of data locations identified in the responses from the web site. The network node 30; 35 is further configured to select, for each of the at least one web site, a smaller subset of at least one data location from the identified set of data locations to act as candidate data location(s) for pre-loading data for the network client. The network node 30; 35 is also configured to transfer, for each of the at least one web site, the smaller subset of at least one data location acting as candidate data location(s) to a pre-loading unit 32, for enabling pre-loading of data based on the candidate data location(s).

By way of example, the network node 30; 35 is configured to execute different clients for sending, to each of the web site(s), the requests for data. The network node 30; 35 is configured to identify data locations that are recurring in responses corresponding to requests for data sent by at least two different clients, and select at least part of the recurring data locations as candidate data locations.

In a particular example, the network node 30; 35 is configured to select at least two candidate data locations, and configured to determine, for each of the at least one web site, at least one of ordering and timing for pre-loading data from the candidate data locations. The network node 30; 35 is also configured to transfer information indicative of at least one of ordering and timing, for each one of the at least one web site, together with the candidate data locations to the pre-loading unit.

For example, the network node 30; 35 may be configured to analyze request patterns in the responses to predict the ordering and/or timing for pre-loading data from the candidate data locations.

As previously indicated, e.g. with reference to FIGS. 3 and 4, the network node 30 may be configured to transfer the smaller subset of at least one data location acting as candidate data location(s) to a pre-loading unit 32 in the same network node 30. Alternatively, the network node 35 is configured to transfer the smaller subset of at least one data location acting as candidate data location(s) to a pre-loading unit (32) in a separate network node 30.

There is also provided a network node 30 configured to provide data to a network client 10 in a communication network. The network node 30 is configured to receive, from the network client, information specifying a web site 20. The network node 30 is also configured to provide, for the specified web site, at least one candidate data location selected based on compiled data location statistics. The network node is 30 configured to pre-load, from a server corresponding to the specified web site 20, data specified by the at least one candidate data location. The network node 30 is further configured to send, in response to a subsequent request from the network client for data specified by a data location matching the at least one candidate data location, the pre-loaded data to the network client.

As an example, the network node 30 is configured to determine the at least one candidate data location or receive the at least one candidate data location from another network node 35, in advance of providing data to the network terminal, wherein the at least one candidate data location is pre-selected based on the compiled data location statistics.

According to another example, the network node 30 is configured to provide at least two candidate data locations, and further configured to pre-load data specified by the at least two candidate data locations from the remote server according to an estimated ordering and/or timing of subsequent data requests by the network client.

In a particular example, the network node comprises a processor and a memory, wherein the memory comprises instructions executable by the processor, whereby the network node/processor is operative to perform at least part of the steps and/or actions described herein.

Figure 13:
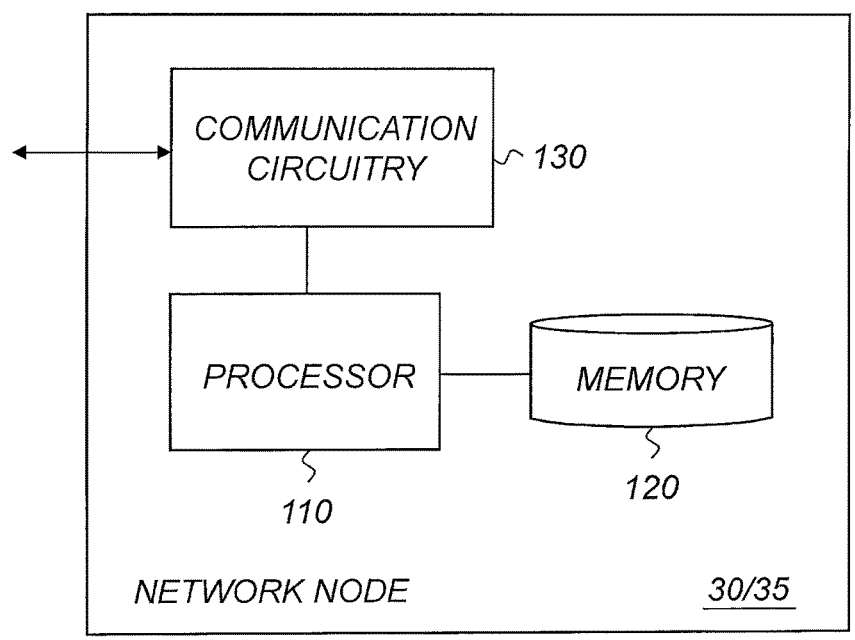
FIG. 13 is a schematic block diagram illustrating an example of a network node according to an embodiment.

FIG. 13 is a schematic block diagram illustrating an example of a network node 30; 35 comprising a processor 110 and an associated memory 120, and optional communication circuitry 130.

In this particular example, at least some of the steps, functions, procedures, modules and/or blocks described herein may be implemented in a computer program, which is loaded into the memory for execution by processing circuitry including one or more processors 110. The processor(s) 110 and memory 120 are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

Optionally, the network node 30/35 also comprises communication circuitry 130. The communication circuitry may include functions for wired and/or wireless communication with other devices and/or network nodes in the network. In case of a wireless device, the device may include radio circuitry for communication with one or more other nodes, including transmitting and/or receiving information. The communication circuitry 130 is interconnected to the processor 110 and/or memory 120.

In a particular example, the network node 30; 35 for enabling pre-loading of data for a network client comprises a processor 110 and a memory (120), the memory 120 comprising instructions executable by the processor 110, whereby the network node 30; 35 is operative to compile the data location statistics including a set of data locations identified in the responses and to select the smaller subset of at least one data location, and to prepare the smaller subset of at least one data location for transfer to the pre-loading unit 32.

The network node 30; 35 may also comprise communication circuitry 130 configured to send the requests and receive the responses.

In another particular example, the network node 30 for providing data to a network client comprises a processor 110 and a memory 120, the memory 120 comprising instructions executable by the processor 110, whereby the network node 30 is operative to provide the at least one candidate data location.

The network node 30 may also comprise communication circuitry 130 configured to receive information specifying a web site, to pre-load data from the remote server and to send the pre-loaded data to the network client.

In a particular embodiment, the computer program comprises instructions, which when executed by at least one processor, cause the processor(s) to perform at least part of the functions, steps, and/or actions described herein.

For example, there is provided a computer program comprising instructions, which when executed by at least one processor, cause the processor(s) to:
 prepare data requests for sending to at least one web site hosted by at least one server;
 read responses, corresponding to the data requests, received from the at least one web site;
 compile, for each of the at least one web site, data location statistics including a set of data locations identified in the responses from the web site;
 select, for each of the at least one web site, a smaller subset of at least one data location from the identified set of data locations to act as candidate data location(s) for pre-loading data for the network client; and
 prepare, for each of the at least one web site, the smaller subset of at least one data location acting as candidate data location(s) for transfer to a pre-loading unit.

There is also provided a computer program comprising instructions, which when executed by at least one processor, cause the processor(s) to:
 read information specifying a web site;
 provide, for the specified web site, at least one candidate data location selected based on compiled data location statistics;
 control pre-loading, from a server corresponding to the specified web site, of data specified by the at least one candidate data location; and
 prepare, in response to a subsequent request from the network client for data specified by a data location matching the at least one candidate data location, the pre-loaded data for transfer to the network client.

The proposed technology also provides a carrier comprising the computer program(s), wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may therefore be regarded as a computer flow diagram or diagrams, when performed by one or more processors. A corresponding network node may be defined as a group of function modules, where each step performed by the processor corresponds to a function module. In this case, the function modules are implemented as a computer program running on the processor. Hence, the network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Figure 14:
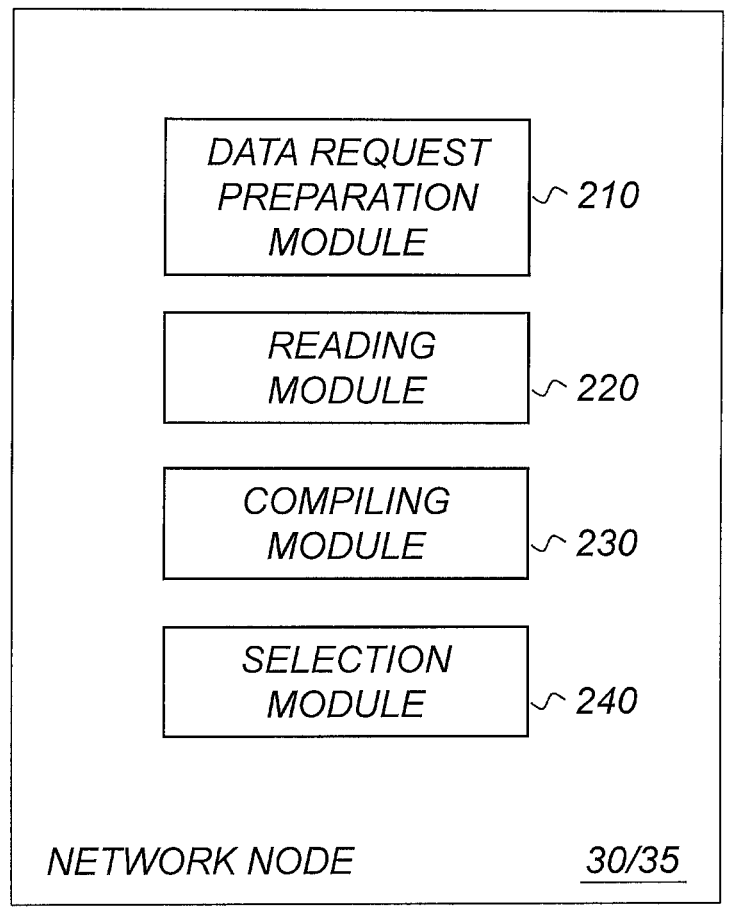
FIG. 14 is a schematic block diagram illustrating an example of a network node for supporting pre-loading of data for a network client according to an embodiment.
Figure 15:
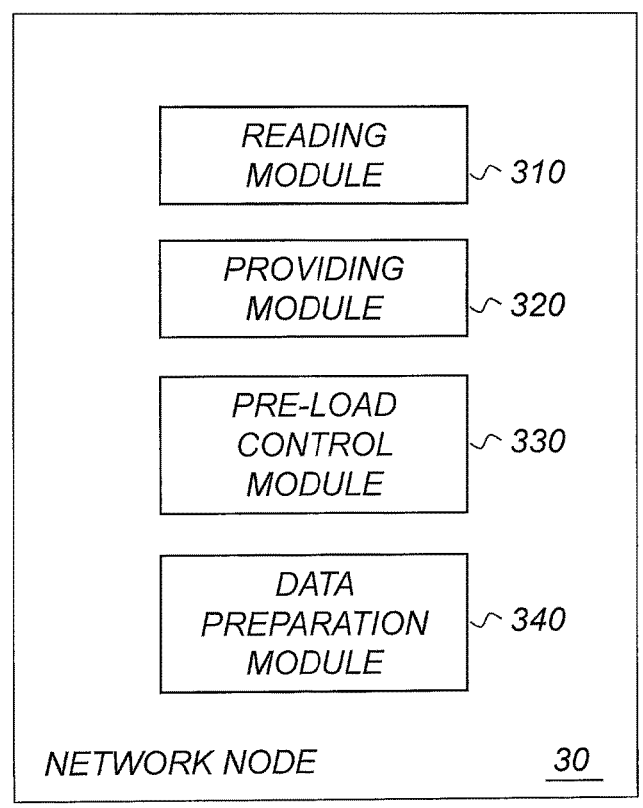
FIG. 15 is a schematic block diagram illustrating an example of a network node for supporting transfer of data to a network client according to an embodiment.

FIGS. 14 and 15 are schematic block diagrams illustrating examples of network nodes comprising a group of function modules.

FIG. 14 is a schematic block diagram illustrating an example of a network node for supporting pre-loading of data for a network client according to an embodiment. In this particular example, the network node 30; 35 comprises a data request preparation module 210 for preparing data requests for sending to at least one web site hosted by at least one server. The network node also comprises a reading module 220 for reading responses, corresponding to the data requests, received from the at least one web site. The network node comprises a compiling module 230 for compiling, for each of the at least one web side, data location statistics including a set of data locations identified in the responses from the web site. The network node further comprises a selection module 240 for selecting, for each of the at least one web site, a smaller subset of at least one data location from the identified set of data locations to act as candidate data location(s) for pre-loading data for the network client.

Optionally, the network node may include a transfer preparation module for preparing, for each of the at least one web site, the smaller subset of at least one data location acting as candidate data location(s) for transfer to a pre-loading unit.

FIG. 15 is a schematic block diagram illustrating an example of a network node for supporting transfer of data to a network client according to an embodiment. The network node 30 comprises a reading module 310 for reading information specifying a web site. The network node 30 also comprises a providing module 320 for providing, for the specified web site, at least one candidate data location selected based on compiled data location statistics. The network node 30 comprises a pre-load control module 330 for controlling pre-loading, from a remote server corresponding to the specified web site, of data specified by the at least one candidate data location. The network node 30 further comprises a data preparation module 340 for preparing, in response to a subsequent request from the network client for data specified by a data location matching the at least one candidate data location, the pre-loaded data for transfer to the network client.

For example, with regard to the pre-load control module 330, a processor 110 in the network node may execute instructions to control the network node to perform pre-loading of data specified by the candidate data location(s). By way of example, this pre-load control could involve controlling transmission of requests for data from the candidate data locations, and storing the corresponding received data in a memory 120 of the network node.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] "Optimizing Page Loading in the Web Browser", A. Koivisto, Mar. 23, 2008.
[2] WO 2013/170903.

The invention claimed is:

1. A method performed by a base station for enabling pre-loading of data for a wireless device in a telecommunication network, wherein the method comprises the steps of:
receiving requests for data from a plurality of wireless devices;
sending the requests for data from the plurality of wireless devices to at least one web site hosted by at least one server;
receiving responses corresponding to the requests for data from the at least one web site;
compiling, for each of the at least one web site, data location statistics including a set of data locations identified in the responses from the web site;
selecting, for each of the at least one web site, a smaller subset of at least one data location from the identified set of data locations to act as candidate data locations for pre-loading data for the wireless device by identifying data locations that are recurring in responses corresponding to requests for data sent by at least two wireless devices of the plurality of wireless devices, wherein selecting, for each of the at least one web site, the smaller subset of at least one data location from the identified set of data locations comprises selecting recurring data locations with a recurrence frequency above a threshold as candidate data locations; and
transferring, for each of the at least one web site, the smaller subset of at least one data location acting as the candidate data locations to a pre-loading unit, for enabling pre-loading of data based on the candidate locations.

2. The method of claim 1, wherein the recurring data locations are deterministic data locations in common for the responses corresponding to the requests for the data sent by at least two different clients.

3. The method of claim 1, wherein, if a data location is selected as a candidate data location, at least part of dependent data locations related to the selected candidate data location are also selected as candidate data locations.

4. The method of claim 1, wherein at least two candidate data locations are selected, and at least one of ordering and timing for pre-loading data from the candidate data locations is determined for each of the at least one web site, and information indicative of the at least one of ordering and timing is transferred, for each one of the at least one web site, together with the candidate data locations to the pre-loading unit.

5. The method of claim 4, wherein at least some of the requests are triggered by received responses, and the at least one of ordering and timing of the requests is determined by analyzing request patterns in the responses, and the determined ordering or timing of the requests is used as the ordering or timing for pre-loading data from the candidate data locations.

6. The method of claim 1, wherein the step of compiling, for each of the at least one web site, the data location statistics is performed by analyzing web page code related to the responses to identify the data locations, wherein at least a main markup language file corresponding to a requested web page is analyzed to identify the data locations.

7. The method of claim 1, wherein the smaller subset of the at least one data location acting as the candidate data locations is transferred to a pre-loading unit in the base station, or transferred to a pre-loading unit in a separate base station.

8. The method of claim 7, wherein, for each one of the at least one web site, the smaller subset of the at least one data location acting as the candidate data locations is provided in a list of data locations for transfer to the separate base station, wherein the list of data locations capable of acting as candidate data locations is organized per web site.

9. The method of claim 1, wherein the candidate data locations are Uniform Resource Locators, URLs, and corresponding data includes web content.

10. The method of claim 1, wherein the candidate data locations are updated based on feedback related to missing data locations discovered during pre-loading.

11. A method performed by a base station for providing data to a plurality of wireless devices in a telecommunication network, wherein the method comprises the steps of:
receiving, from the plurality of wireless devices, information specifying a web site;
sending requests for data received from the plurality of wireless devices to the specified web site;
receiving responses corresponding to the requests for data from the specified web site;
providing, for the specified web site, at least one candidate data location selected based on compiled data location statistics, wherein the compiled data location statistics include a set of data locations and the at least one candidate data location is selected from a smaller subset of at least one data location from the set of data locations that are identified data locations that recur in responses corresponding to requests for data sent by at least two different wireless devices of the plurality of wireless devices, wherein the base station selects the smaller subset of at least one data location by selecting recurring data locations with a recurrence frequency above a threshold as candidate data locations;
pre-loading, from a server corresponding to the specified web site, data specified by the at least one candidate data location; and
sending, in response to a subsequent request from a wireless device of the plurality of wireless devices for data specified by a data location matching the at least one candidate data location, the pre-loaded data to a wireless device.

12. The method of claim 11, wherein the base station determines the at least one candidate data location, or receives the at least one candidate data location from another base station, in advance of providing data to a network terminal, wherein the at least one candidate data location is pre-selected based on the compiled data location statistics.

13. The method of claim 11, wherein at least two candidate data locations are provided, and data specified by the at least two candidate data locations are pre-loaded from a remote server according to an estimated ordering or timing of subsequent data requests by the wireless device.

14. The method of claim 11, wherein the candidate data locations are Uniform Resource Locators, URLs, and the corresponding data includes web content, and the wireless device is a web browser running on a network terminal.

15. The method of claim 11, wherein the at least one candidate data location for pre-loading data for the wireless device is selected.

16. A base station for enabling pre-loading of data for a wireless device in a telecommunication network, the base station comprising:
   processing circuitry comprising one or more processors, the processing circuitry configured to cause the base station to:
      send requests for data from a plurality of different wireless devices to at least one web site hosted by at least one server;
      receive responses corresponding to the requests for data from the at least one web site;
      compile, for each of the at least one web site, data location statistics including a set of data locations identified in the responses from the web site;
      select, for each of the at least one web site, a smaller subset of the at least one data location from the identified set of data locations to act as candidate data locations for pre-loading data for the wireless device by identifying data locations that are recurring in responses corresponding to requests for data sent by at least two different wireless devices of the plurality of different wireless devices, wherein when selecting, for each of the at least one web site, the smaller subset of at least one data location from the identified set of data locations, the base station is configured to select recurring data locations with a recurrence frequency above a threshold as candidate data locations; and
      transfer, for each of the at least one web site, the smaller subset of at least one data location acting as the candidate data locations to a pre-loading unit, for enabling pre-loading of data based on the candidate data locations.

17. The base station of claim 16, wherein the wireless device is configured to select at least part of the recurring data locations as candidate data locations.

18. The base station of claim 16, wherein the base station is configured to select at least two candidate data locations,
   wherein the base station is configured to determine, for each of the at least one web site, at least one of ordering and timing for pre-loading data from the candidate data locations, and
   wherein the base station is configured to transfer information indicative of the at least one of ordering and timing, for each one of the at least one web site, together with the candidate data locations to the pre-loading unit.

19. The base station of claim 16, wherein the base station is configured to analyze request patterns in the responses to predict ordering or timing for pre-loading data from the candidate data locations.

20. The base station of claim 16, wherein the base station is configured to transfer the smaller subset of the at least one data location acting as the candidate data locations to a pre-loading unit in the same base station, or wherein the base station is configured to transfer the smaller subset of the at least one data location acting as the candidate data locations to a pre-loading unit in a separate base station.

21. The base station of claim 16, wherein the base station further comprises a memory, the memory comprising instructions executable by the processing circuitry, whereby the base station is operative to compile the data location statistics including the set of data locations identified in the responses and to select the smaller subset of the at least one data location, and to prepare the smaller subset of the at least one data location for transfer to the pre-loading unit.

22. The base station of claim 16, wherein the base station further comprises communication circuitry configured to send the requests and receive the responses.

23. A base station for providing data to a plurality of wireless devices in a telecommunication network, the base station comprising:
   processing circuitry comprising one or more processors, the processing circuitry configured to cause the base station to:
      receive, from the plurality of wireless devices, information specifying a web site;
      send requests for data from a plurality of different wireless devices for the specified web site;
      receive responses corresponding to the requests for data from the specified web site;
      provide, for the specified web site, at least one candidate data location selected based on compiled data location statistics, wherein the compiled data location statistics include a set of data locations and the at least one candidate data location is selected from a smaller subset of at least one data location from the set of data locations that are identified data locations that recur in responses corresponding to requests for data sent by at least two different wireless devices clients of the plurality of different wireless devices, wherein the base station selects the smaller subset of at least one data location by selecting recurring data locations with a recurrence frequency above a threshold as candidate data locations;
      pre-load, from a server corresponding to the specified web site, data specified by the at least one candidate data location; and
      send, in response to a subsequent request from a wireless device for data specified by a data location matching the at least one candidate data location, the pre-loaded data to the wireless device.

24. The base station of claim 23, wherein the processing circuitry is further configured to cause the base station to determine the at least one candidate data location or receive the at least one candidate data location from another base station, in advance of providing data to a network terminal, wherein the at least one candidate data location is pre-selected based on the compiled data location statistics.

25. The base station of claim 23, wherein the base station is configured to provide at least two candidate data locations, and
   wherein the processing circuitry is further configured to cause the base station to pre-load data specified by the at least two candidate data locations from a remote server according to an estimated ordering or timing of subsequent data requests by the wireless device.

26. The base station of claim 23, wherein the base station further comprises communication circuitry configured to receive information specifying a web site, to pre-load data from a remote server and to send the pre-loaded data to the wireless device.

27. A base station for supporting pre-loading of data for a wireless device in a telecommunication network, the base station comprising:
processing circuitry comprising one or more processors, the processing circuitry configured to cause the base station to:
prepare data requests for sending to at least one web site hosted by at least one server;
read responses, corresponding to the data requests, received from the at least one web site;
compile, for each of the at least one web site, data location statistics including a set of data locations identified in the responses from the web site; and
select, for each of the at least one web site, a smaller subset of at least one data location from the identified set of data locations to act as candidate data locations for pre-loading data for the wireless device by identifying data locations that are recurring in responses corresponding to requests for data sent by at least two different wireless devices of a plurality of wireless devices, wherein, when selecting, for each of the at least one web site, the smaller subset of at least one data location from the identified set of data locations the base station is configured to select recurring data locations with a recurrence frequency above a threshold as candidate data locations.

28. A base station for supporting transfer of data to a wireless device in a telecommunication network, the base station comprising:
processing circuitry comprising one or more processors, the processing circuitry configured to cause the base station to:
read information specifying a web site;
send requests for data from a plurality of different wireless devices for the specified web site;
receive responses corresponding to the requests for data from the specified web site;
provide for the specified web site, at least one candidate data location selected based on compiled data location statistics;
select a smaller subset of at least one data location from the identified set of data locations to act as candidate data locations for the wireless device by identifying data locations that are recurring in responses corresponding to requests for data sent by at least two different wireless devices of the plurality of different wireless devices, wherein, when selecting the smaller subset of at least one data location from the identified set of data locations the base station is configured to select recurring data locations with a recurrence frequency above a threshold as candidate data locations;
control pre-loading, from a remote server corresponding to the specified web site, of data specified by the at least one candidate data location; and
prepare, in response to a subsequent request from the wireless device for data specified by a data location matching the at least one candidate data location, the pre-loaded data for transfer to the wireless device.

* * * * *